United States Patent [19]
Rodemer et al.

[11] Patent Number: 5,443,091
[45] Date of Patent: Aug. 22, 1995

[54] NON-RETURN VALVE WITH IMPROVED LINE CONNECTING MECHANISM

[75] Inventors: Karl Rodemer, Heidelberg; Zdravko Paluncic, Speyer, both of Germany

[73] Assignee: Lincoln GmbH, Walldorf, Germany

[21] Appl. No.: 243,766

[22] Filed: May 17, 1994

[30] Foreign Application Priority Data

May 18, 1993 [DE] Germany .................. 43 16 581.8

[51] Int. Cl.⁶ .................................................. F16K 15/04
[52] U.S. Cl. ................................. 137/515.7; 285/322
[58] Field of Search ................. 137/515.7; 285/322, 285/323

[56] References Cited

U.S. PATENT DOCUMENTS

| | | | |
|---|---|---|---|
| 3,189,046 | 6/1965 | Callahan | 137/515.7 |
| 3,605,808 | 9/1971 | Fisher . | |
| 4,005,883 | 2/1977 | Guest | 285/322 |
| 4,396,035 | 8/1983 | Maples . | |
| 4,453,569 | 6/1984 | Symmons . | |
| 4,532,958 | 8/1985 | Napolitano | 137/515.7 |
| 4,685,706 | 8/1987 | Kowal | 285/322 |

FOREIGN PATENT DOCUMENTS

| | | |
|---|---|---|
| 0314969 | 5/1989 | European Pat. Off. . |
| 0379655 | 8/1990 | European Pat. Off. . |
| 0462079 | 12/1991 | European Pat. Off. . |

*Primary Examiner*—Robert G. Nilson
*Attorney, Agent, or Firm*—Wenderoth, Lind & Ponack

[57] ABSTRACT

A non-return valve, particularly adapted for a medium distributor, for example a lubricant distributor, includes a valve body having therethrough a passage for the flow therethrough of a medium. The passage has an inlet end and an outlet end. The passage further has therein a valve seat and a constricted portion. The valve body is connectable to a medium outlet for supply of medium to the inlet end of the passage. A valve closing element is positioned within the passage and is urged toward the valve seat by a spring. A connecting mechanism enables a medium line to be connected to the valve body. The connecting mechanism includes a gripping element having an inner end that is spreadable outwardly upon insertion of the medium line into the element. The gripping element extends into the outlet end of the passage with the inner end of the gripping element being located at a position inwardly beyond the constricted portion of the passage.

52 Claims, 1 Drawing Sheet

NON-RETURN VALVE WITH IMPROVED LINE CONNECTING MECHANISM

BACKGROUND OF THE INVENTION

The present invention relates to a non-return valve, especially such a non-return valve for use in a lubricant distributor of the progressive distributor type, and including a valve body that can be attached, for example by threading, into a medium outlet of a distributor body, particularly into a lubricant outlet of a distributor block. The present invention further is related to such a non-return valve of the type wherein the valve body has therethrough a passage or channel through which medium, for example lubricant, is to flow between inlet and outlet ends of the passage. The present invention further relates to such a non-return valve having a valve closing element that is pressed by a restoring spring against a valve seat provided in the passage through the valve body. The present invention further relates to such a non-return valve having a connecting mechanism by which it is possible to connect an outlet line, for example a lubricant outlet line, to the valve body.

Non-return valves are employed, for example, with progressive distributors in order to guarantee reliable and flawless conveyance of lubricant to other distributors or to lubricating points. It is conventional to connect lubricant lines to such non-return valves by means of fittings with cutting rings. The manufacture of such connections is relatively time consuming and expensive.

SUMMARY OF THE INVENTION

Accordingly, it is an object of the present invention to provide a non-return valve of the above general type, but improved to avoid the above and other prior art disadvantages.

It is a further object of the present invention to provide a medium distributor, for example a lubricant distributor, incorporating one or more of such improved non-return valves.

It is a still further object of the present invention to provide such an improved non-return valve whereby it is possible to achieve a faster connection to the valve of a medium outlet line, in particular a lubricant line.

It is a similar object of the present invention to provide such an improved medium distributor, for example a lubricant distributor of the progressive distributor type, incorporating plural such improved non-return valves whereby it is possible to obtain faster connection of lubricant lines.

These objects are achieved in accordance with the present invention by the arrangement that the connecting mechanism of the non-return valve includes a gripping element, at least an inner end of which is spreadable outwardly upon insertion of a medium line into the gripping element. The gripping element extends into the medium outlet end of the passage through the valve body with the inner end of the gripping element being located at a position beyond a constricted portion of the passage through the valve body. Such non-return valve construction makes it possible to achieve fast and reliable plug-type connection of a medium outlet line to the valve body while retaining a simple design of the connection mechanism.

The gripping element essentially is cylindrical in configuration and has formed therein longitudinal slots that extend from the inner end of the cylindrical gripping element. Therefore, when the medium line to be connected is inserted or plugged into the gripping element, the inner end of the gripping element is allowed to spread apart uniformly in all directions to all sides due to the provision of the longitudinal slots. The medium line no longer can be pulled from the gripping element without effort, because the spread apart inner end of the gripping element no longer can be pulled outwardly past the constricted portion of the passage. To facilitate this arresting or retaining effect, the inner end of the gripping element can be flared or angled outwardly, at least region-by-region.

Furthermore, in accordance with a further feature of the invention, the passage may include a conical portion extending from the constricted portion in a direction toward the medium inlet end of the passage and defined by a conical surface inclined outwardly in such direction. The inner end of the gripping element confronts such conical surface. As a result, when an attempt is made to pull the medium line and thereby the gripping element outwardly, the inner end of the gripping element moves along the conical surface and thereby is forced inwardly, thereby further fastening the medium line to the gripping element.

The conical portion of the passage, at an end thereof remote from the constricted portion of the passage, can join a circumferential groove portion of the passage, for example formed in the valve body. A sealing ring is positioned in this circumferential portion of the passage and thereby improves the seal between the connecting medium line with respect to the valve body.

In accordance with a further feature of the present invention, it is possible to achieve a simple assembly of the non-return valve and reliable operation thereof by provision of a holding element positioned within the passage, and with the spring having opposite ends braced between the holding element and the valve closing element. The holding element preferably has a generally cylindrical configuration and includes a tapered projection and an outwardly flared or conical end portion. Such structural configuration ensures that, on the one hand, the valve closing element is supported centrally, and on the other hand that the holding element itself is braced uniformly over its entire circumference against the valve body. The holding element includes a tapered projection accommodating thereabout the spring, and the outwardly flared end portion of the holding element is directed away from the spring and is braced against the valve body. This bracing can be improved by bracing such tapered end in a groove portion of the passage formed in the valve body.

In accordance with a further feature of the present invention, the valve body carries undetachably on an inlet side attachment or projection thereof a conical clamping ring to be employed for the purpose of sealing the medium outlet. Preferably the projection or attachment has a recess, the clamping ring fits within the recess, and a collar of the attachment or projection closes an end of the recess and maintains the clamping ring therein. This feature of the present invention is particularly advantageous when the non-return valve is used for a progressive distributor. Thus, when the non-return valve is being assembled to a distributor body, if the clamping ring is not undetachably connected to the non-return valve, such clamping ring may be forgotten during assembly. If this happens, no defined metering will be achieved. With the present invention however, whenever the non-return valve is assembled to the distributor body, then the clamping ring also automatically will be assembled in position. On the other hand, if two outlet channels of a progressive distributor are to be connected together, then the non-return valve and the clamping ring have to be removed, and the medium outlet has to be closed by a threaded plug. If the clamping ring is detachable from the non-return valve and is not removed from the distributor, or if the clamping ring is mounted inadvertently together with the threaded plug, the lubricant distributor will be blocked. In accordance with the present invention however, whenever the non-return valve is removed from the distributor, the clamping ring also automatically is removed therefrom. Thus, these types of improper assembly positions automatically are prevented by use of the non-return valve of the present invention.

BRIEF DESCRIPTION OF THE DRAWINGS

Other objects, features, advantages and possible applications of the invention will be apparent from the following detailed description of a preferred embodiment thereof, with reference to the accompanying drawings. All described and/or illustrated features formed by themselves or in any arbitrary logical combination the subject matter of the present invention, independently of their description or illustration. In the drawings.

DETAILED DESCRIPTION OF THE INVENTION

Figure 1:
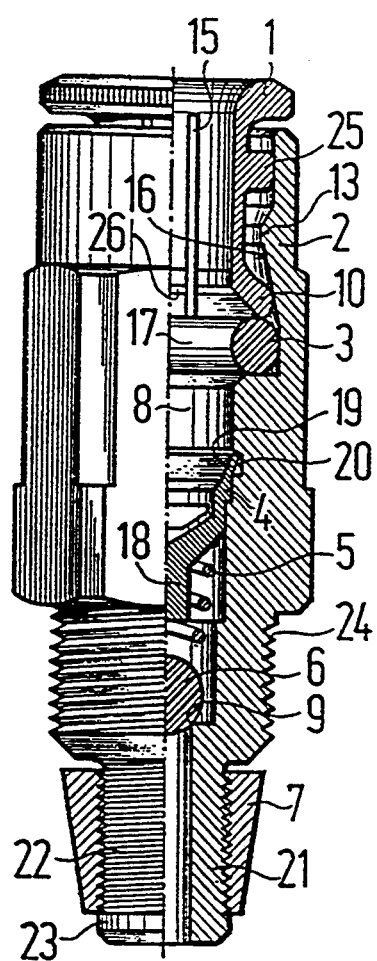
FIG. 1 is an elevation view, partially in section, of a non-return valve in accordance with the present invention.

Illustrated in FIG. 1 is an embodiment of a non-return valve in accordance with the present invention. The non-return valve includes a valve body 2 having extending therethrough a longitudinal passage or channel 8 for the flow therethrough of a medium, for example a lubricant. The passage 8 has a medium inlet end, i.e. the lower end shown in FIG. 1, and a medium outlet end, i.e. the upper end shown in FIG. 1. The contour of passage 8 varies between the inlet and outlet ends. Particularly, the passage 8 has therein a valve seat 9 and spaced upwardly therefrom as shown in FIG. 1 is a constricted portion 13. A valve closing element 6, in the form of a ball, is positioned within passage 8 and is pressed toward valve seat 9 by a restoring spring 5. A holding element 4 positions spring 5 such that spring 5 is braced between valve closing element 6 and holding element 4. Thus, holding element 4 is generally cylindrical or tube shaped and includes a tapered projection 18 against which abuts the outlet end of spring 5. Holding element 4 further includes at the outlet end thereof an outwardly expanded or flared end 19 that is braced in a groove 20 of passage 8 that is formed in valve body 2. This retains holding element 4 in position, with spring 5 being braced against holding element 4 and urging valve closing element 6 toward valve seat 9.

Figure 2:
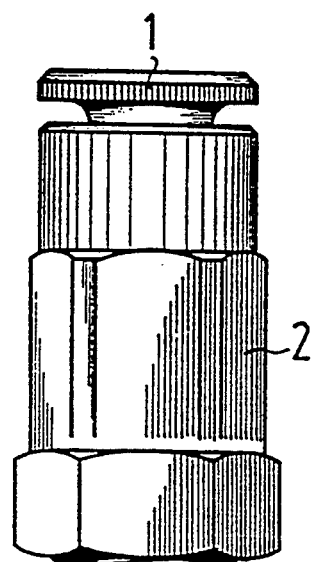
FIG. 2 is a sectional view of a distributor block having two medium outlets, into one of which is installed a non-return valve according to the present invention.
Figure 2:
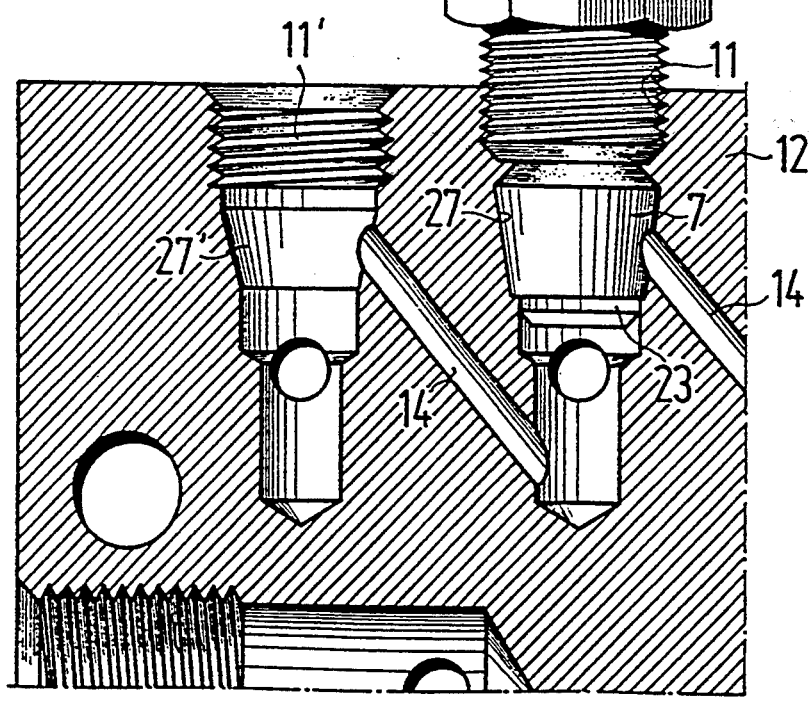

As shown in FIG. 2, the valve body 2 of the non-return valve is connectable, for example by screw threads 24 thereof, to a medium outlet 11 of a distributor block 12 such that a medium can be supplied to the medium inlet end of passage 8. In the particularly illustrated arrangement, it is contemplated that distributor block 12 is part of a lubricant distributor of the progressive distributor type wherein block 12 includes plural lubricant outlets 11. Pressure of lubricant within the respective medium outlet is supplied to passage 8, thereby moving valve closing element 6 away from valve seat 9 such that the lubricant then can flow to the medium outlet end of the passage 8.

Medium, such as lubricant, flowing from the medium outlet end of the passage 8 must pass to a medium line or conduit, and the non-return valve includes a connecting mechanism for connecting such medium line (not shown) to the non-return valve. In accordance with the present invention, such connecting mechanism is in the form of a hollow cylindrical gripping element 1 having an outer circumferential flange 25 guided in the outlet end of the passage 8. The gripping element 1 further has an inner end 10 tapered outwardly relative to flange 25 and located at a position inwardly beyond constricted portion 13. Inner end 10 is tapered or flared outwardly toward the inlet end of passage 8. At least the inner end of the gripping element 1 is of a construction such that it is spreadable outwardly upon insertion of the medium line into the gripping element. In the particularly illustrated arrangement, the entire axial length of the gripping element 1, except for an outer end head portion thereof, is provided with longitudinally extending slots 15. Therefore, when a medium line is inserted or plugged into gripping element 1, the slotted portion of the gripping element 1 can spread apart outwardly in all directions. This will occur at least at the inlet end of the gripping element. As a result, the outwardly angled inner end 10 is enlarged such that it cannot be withdrawn outwardly past constricted portion 13. That is, any attempt to pull the medium line outwardly will similarly result in an attempted outward movement of gripping element 1. This will prevented by constricted portion 13, with the result that the gripping element 1 further clamps the medium line. This feature and effect are facilitated by the further formation in passage 8 of a conical portion extending from constricted portion 13 in a direction toward the medium inlet end of the passage. Such conical portion is defined by a conical surface 16 inclined outwardly in the direction toward the medium inlet end of the passage. The outer surface of the outwardly flared inlet end 10 of the gripping element 1 rests against conical surface 16. The conical portion defined by conical surface 16, on the side thereof remote from constricted portion 13, joins a circumferential groove portion 17 of the passage 8. A circumferential sealing ring 3 is positioned in circumferential groove portion 17 and achieves a seal between the valve body 2 and the plugged-in medium connecting line.

To achieve connection of the medium line, the medium line has only to be pushed into gripping element 1 as far as confronting sealing ring 3 to achieve both clamping of the medium line by gripping element 1 and sealing of the medium line with respect to the valve body 2. If at this time the medium line is pulled outwardly or the gripping element 1 is moved outwardly, for example due to build-up of pressure of the medium, the inner end 10 of the gripping element 1 moves along conical surface 16, thus further tightly clamping the medium line against the pressure build-up. In any case, the gripping element and medium line will not be discharged from the valve body due to the presence of constricted portion 13. Thus, the gripping element can be moved only slightly axially outwardly during a pressure build-up or when the medium line is pulled outwardly. The gripping element can have an annular ring 26 internally at the transition from the cylindrical region of the gripping element to the outwardly flared or tapered region of the inner end 10 thereof.

In accordance with a further feature of the present invention, the inlet end of the valve body 2 has an attachment or projection 21 that is recessed inwardly relative to threaded region 24, and that can be tapered relative thereto. Attachment 21 has formed on the exterior thereof a recess 22, the inlet end of which can be closed by a collar 23. A conical clamping ring 7 is mounted within the recess 22, for example by mating screw-threads as illustrated, and is retained in the recess by collar 23 such that clamping ring 22 is undetachably mounted. As shown in FIG. 2, when the non-return valve is mounted in medium outlet 11, conical clamping ring 7 fits into a corresponding conical section 27 of outlet 11 within the distributor block 12. A connecting channel 14 from an adjacent medium outlet 11 opens into conical section 27. Thus, the function of clamping ring 7 is a metallic seal blocking connecting channel 14 when the non-return valve is installed, such that the two adjacent medium outlets 11 are not connected. By the arrangement of the present invention of the conical clamping ring 7 fitting in recess 22 and retained therein by collar 23, the clamping ring 7 is undetachably mounted on the non-return valve, such that the clamping ring 7 will not be inadvertently disassembled therefrom.

Although the present invention has been described and illustrated with respect to preferred features thereof, it is to be understood that various changes and modifications may be made to the specifically described and illustrated features without departing from the scope of the present invention.

We claim:

1. A non-return valve comprising:
a valve body having therethrough a passage for the flow therethrough of a medium, said passage having a medium inlet end and a medium outlet end, and said passage having therein a valve seat and a constricted portion, said valve body being connectable to a medium outlet for supply of medium to said medium inlet end of said passage;
a valve closing element urged toward said valve seat by a spring;
a connecting mechanism to connect a medium line to said valve body, said connecting mechanism including a gripping element having an inner end that is spreadable outwardly upon insertion of the medium line into said gripping element, said gripping element extending into said medium outlet end of said passage with said inner end of said gripping element being located at a position beyond said constricted portion of said passage; and
a holding element positioned within said passage, said spring having opposite ends braced between said holding element and said valve closing element, said holding element including a tapered projection accommodating thereabout said spring and an outwardly flared end directed away from said spring and braced against said valve body.

2. A valve as claimed in claim 1, wherein said gripping element is of substantially cylindrical configuration and has formed therein longitudinal slots extending from said inner end.

3. A valve as claimed in claim 2, wherein said slots are spaced equally circumferentially of said gripping element.

4. A valve as claimed in claim 2, wherein said slots extend throughout substantially an entire length portion of said gripping element positioned within said passage.

5. A valve as claimed in claim 1, wherein said passage further includes a conical portion extending from said constricted portion in a direction toward said medium inlet end of said passage and defined by a conical surface inclined outwardly in said direction, said inner end of said gripping element confronting said conical surface.

6. A valve as claimed in claim 5, wherein said inner end of said gripping element is flared outwardly.

7. A valve as claimed in claim 5, wherein said conical portion of said passage at an end thereof remote from said constricted portion joins a circumferential groove portion of said passage.

8. A valve as claimed in claim 7, further comprising a sealing ring positioned in said circumferential groove portion of said passage.

9. A valve as claimed in claim 1, wherein said inner end of said gripping element is flared outwardly.

10. A valve as claimed in claim 1, wherein said holding element has a generally cylindrical configuration.

11. A value as claimed in claim 1, wherein said flared end of said holding element is braced in a groove portion of said passage.

12. A valve as claimed in claim 1, wherein said valve body has a projection having undetachably mounted thereon a conical clamping ring.

13. A valve as claimed in claim 12, wherein said projection has a recess, said clamping ring fits in said recess, and further comprising a collar closing said recess and maintaining said clamping ring therein.

14. A medium distributor comprising:
a distributor body having exiting therefrom a medium outlet;
a valve body having therethrough a passage for the flow therethrough of a medium, said passage having a medium inlet end and a medium outlet end, and said passage having therein a valve seat and a constricted portion, said valve body being connectable to said medium outlet for supply of medium to said medium inlet end of said passage;
a valve closing element urged toward said valve seat by a spring;
a connecting mechanism to connect a medium line to said valve body, said connecting mechanism including a gripping element having an inner end that is spreadable outwardly upon insertion of the medium line into said gripping element, said gripping element extending into said medium outlet end of said passage with said inner end of said gripping element being located at a position beyond said constricted portion of said passage; and
a holding element positioned within said passage, said spring having opposite ends braced between said holding element and said valve closing element, said holding element including a tapered projection accommodating thereabout said spring and an outwardly flared end directed away from said spring and braced against said valve body.

15. A distributor as claimed in claim 14, wherein said gripping element is of substantially cylindrical configuration and has formed therein longitudinal slots extending from said inner end.

16. A distributor as claimed in claim 15, wherein said slots are spaced equally circumferentially of said gripping element.

17. A distributor as claimed in claim 15, wherein said slots extend throughout substantially an entire length portion of said gripping element positioned within said passage.

18. A distributor as claimed in claim 14, wherein said passage further includes a conical portion extending from said constricted portion in a direction toward said medium inlet end of said passage and defined by a conical surface inclined outwardly in said direction, said inner end of said gripping element confronting said conical surface.

19. A distributor as claimed in claim 18, wherein said inner end of said gripping element is flared outwardly.

20. A distributor as claimed in claim 18, wherein said conical portion of said passage at an end thereof remote from said constricted portion joins a circumferential groove portion of said passage.

21. A distributor as claimed in claim 20, further comprising a sealing ring positioned in said circumferential groove portion of said passage.

22. A distributor as claimed in claim 14, wherein said inner end of said gripping element is flared outwardly.

23. A distributor as claimed in claim 16, wherein said holding element has a generally cylindrical configuration.

24. A distributor as claimed in claim 14, wherein said flared end of said holding element is braced in a groove portion of said passage.

25. A distributor as claimed in claim 14, wherein said valve body has a projection having undetachably mounted thereon a conical clamping ring.

26. A distributor as claimed in claim 25, wherein said projection has a recess, said clamping ring fits in said recess, and further comprising a collar closing said recess and maintaining said clamping ring therein.

27. A distributor as claimed in claim 25, wherein said projection extends into distributor body with said clamping ring blocking a connecting channel between said medium outlet and another medium outlet of said distributor body.

28. A non-return valve comprising:
a valve body having therethrough a passage for the flow therethrough of a medium, said passage having a medium inlet end and a medium outlet end, and said passage having therein a valve seat and a constricted portion, said valve body being connectable to a medium outlet for supply of medium to said medium inlet end of said passage, said valve body having a projection having undetachably mounted thereon a conical clamping ring;
a valve closing element urged toward said valve seat by a spring; and
a connecting mechanism to connect a medium line to said valve body, said connecting mechanism including a gripping element having an inner end that is spreadable outwardly upon insertion of the medium line into said gripping element, said gripping element extending into said medium outlet end of said passage with said inner end of said gripping element being located at a position beyond said constricted portion of said passage.

29. A valve as claimed in claim 28, wherein said gripping element is of substantially cylindrical configuration and has formed therein longitudinal slots extending from said inner end.

30. A valve as claimed in claim 29, wherein said slots are spaced equally circumferentially of said gripping element.

31. A valve as claimed in claim 29, wherein said slots extend throughout substantially an entire length portion of said gripping element positioned within said passage.

32. A valve as claimed in claim 28, wherein said passage further includes a conical portion extending from said constricted portion in a direction toward said medium inlet end of said passage and defined by a conical surface inclined outwardly in said direction, said inner end of said gripping element confronting said conical surface.

33. A valve as claimed in claim 32, wherein said inner end of said gripping element is flared outwardly.

34. A valve as claimed in claim 32, wherein said conical portion of said passage at an end thereof remote from said constricted portion joins a circumferential groove portion of said passage.

35. A valve as claimed in claim 34, further comprising a sealing ring positioned in said circumferential groove portion of said passage.

36. A valve as claimed in claim 28, wherein said inner end of said gripping element is flared outwardly.

37. A valve as claimed in claim 28, further comprising a holding element positioned within said passage, said spring having opposite ends braced between said holding element and said valve closing element.

38. A valve as claimed in claim 37, wherein said holding element has a generally cylindrical configuration.

39. A valve as claimed in claim 28, wherein said projection has a recess, said clamping ring fits in said recess, and further comprising a collar closing said recess and maintaining said clamping ring therein.

40. A medium distributor comprising:
a distributor body having exiting therefrom a medium outlet;
a valve body having therethrough a passage for the flow therethrough of a medium, said passage having a medium inlet end and a medium outlet end, and said passage having therein a valve seat and a constricted portion, said valve body being connectable to said medium outlet for supply of medium to said medium inlet end of said passage, said valve body having a projection having undetachably mounted thereon a conical clamping ring;
a valve closing element urged toward said valve seat by a spring; and
a connecting mechanism to connect a medium line to said valve body, said connecting mechanism including a gripping element having an inner end that is spreadable outwardly upon insertion of the medium line into said gripping element, said gripping element extending into said medium outlet end of said passage with said inner end of said gripping element being located at a position beyond said constricted portion of said passage.

41. A distributor as claimed in claim 40, wherein said gripping element is of substantially cylindrical configuration and has formed therein longitudinal slots extending from said inner end.

42. A distributor as claimed in claim 41, wherein said slots are spaced equally circumferentially of said gripping element.

43. A distributor as claimed in claim 41, wherein said slots extend throughout substantially an entire length portion of said gripping element positioned within said passage.

44. A distributor as claimed in claim 40, wherein said passage further includes a conical portion extending from said constricted portion in a direction toward said medium inlet end of said passage and defined by a conical surface inclined outwardly in said direction, said inner end of said gripping element confronting said conical surface.

45. A distributor as claimed in claim 44, wherein said inner end of said gripping element is flared outwardly.

46. A distributor as claimed in claim 44, wherein said conical portion of said passage at an end thereof remote from said constricted portion joins a circumferential groove portion of said passage.

47. A distributor as claimed in claim 46, further comprising a sealing ring positioned in said circumferential groove portion of said passage.

48. A distributor as claimed in claim 40, wherein said inner end of said gripping element is flared outwardly.

49. A distributor as claimed in claim 40, further comprising a holding element positioned within said passage, said spring having opposite ends braced between said holding element and said valve closing element.

50. A distributor as claimed in claim 49, wherein said holding element has a generally cylindrical configuration.

51. A distributor as claimed in claim 40, wherein said projection has a recess, said clamping ring fits in said recess, and further comprising a collar closing said recess and maintaining said clamping ring therein.

52. A distributor as claimed in claim 40, wherein said projection extends into said distributor body with said clamping ring blocking a connecting channel between said medium outlet and another medium outlet of said distributor body.

* * * * *